Oct. 12, 1926.
H. H. SEELEY
1,602,415
SIDE CURTAIN FOR MOTOR VEHICLES
Filed Nov. 30, 1921
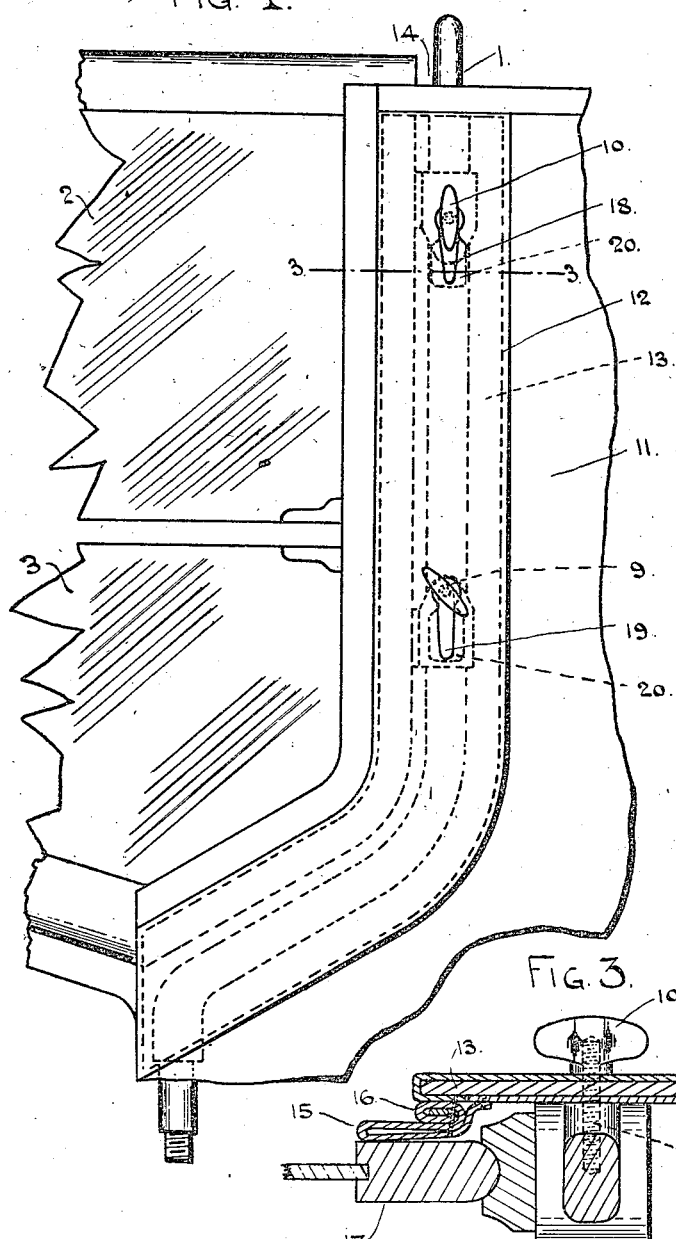
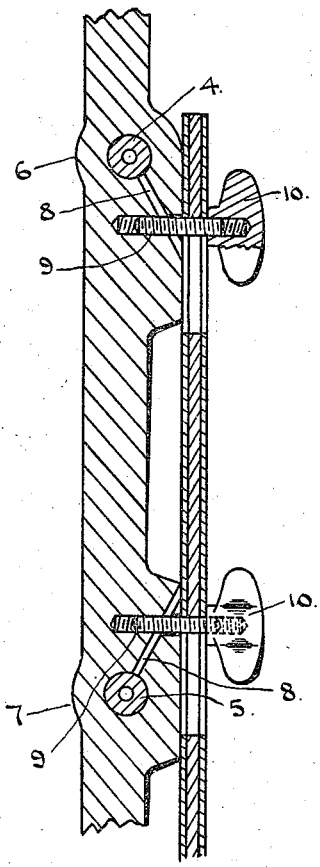
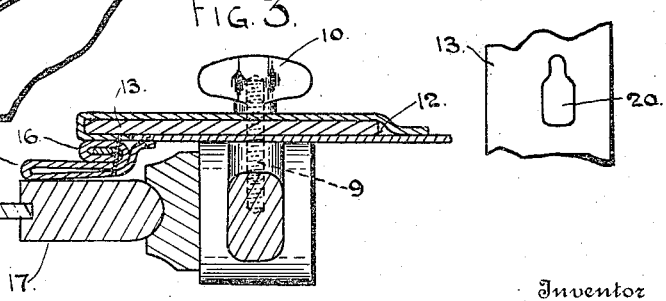
Inventor
HALSTEAD. H. SEELEY.
Attorneys Patented Oct. 12, 1926.

1,602,415

UNITED STATES PATENT OFFICE.

HALSTEAD H. SEELEY, OF DETROIT, MICHIGAN, ASSIGNOR, BY MESNE ASSIGNMENTS, TO MOTOR PRODUCTS CORPORATION (1926), OF DETROIT, MICHIGAN, A CORPORATION OF NEW YORK.

SIDE CURTAIN FOR MOTOR VEHICLES.

Application filed November 30, 1921. Serial No. 518,773.

The invention relates to side curtains for motor vehicles and refers more particularly to the manner of securing a side curtain to the windshield. The invention has for some of its objects the provision of quick detachable means for securing the curtain to the windshield standard whereby the curtain may be readily attached to or detached from the windshield; the provision of a reinforcing member for the curtain which will hold the latter against the windshield and cover the space between the windshield standard and sections, and which at the same time will permit of a smaller number of devices for securing the curtain to the windshield, than the usual construction; the arranging of the curtain with its reinforcement on the rear side of the windshield; and the utilization of clamping members already upon the windshield for securing the curtain thereto. Further objects of the invention reside in the novel features of construction as more fully hereinafter set forth.

In the drawings:—

Figure 1 is a rear elevation of a portion of a windshield and side curtain attached, embodying my invention;

Figure 2 is a longitudinal cross section through a windshield standard with the curtain atttached;

Figure 3 is a cross section on the line 3—3 of Figure 1;

Figure 4 is a side elevation of a portion of the reinforcement for the curtain.

1 is one of the standards of a windshield, and 2 and 3 are respectively the upper and lower glass sections of the windshield, which have the end pivots 4 and 5 respectively journalled in the enlarged portions 6 and 7 respectively of the standard. These enlarged portions are each split as at 8 and to clamp the same upon the pivots 4 and 5, there are the studs 9 threadedly engaging the main parts of the enlargements and freely passing through the other parts which are to the rear of the splits and the wing nuts 10 engageable with the rear parts to adjust the same toward the main parts and thereby clamp the pivots.

11 is a side curtain of the motor vehicle which is adapted to be secured to the windshield and, as shown, this curtain has the pocket 12 at its edge in which is secured the reinforcement strip 13 which extends longitudinally of the windshield standard 1. The reinforcement strip is of sufficient width to overlap the windshield standard 1 and also the ends of the windshield sections 2 and 3 thereby covering the gap 14 between the standard and sections. The securing edge of the side curtain is at the rear sides of the standard and sections and to form a weather-seal between this edge of the side curtain and the sections, there are the folds 15 and 16 upon the outside of the curtain, which folds are engageable with the frames 17 of the sections.

To form a quick detachable connection between the side curtain and the windshield, the pocket of the side curtain has the elongated apertures 18 and 19 therethrough, which are spaced from each other a distance such that the pocket may be passed over both of the wing nuts 10 at the same time. Furthermore, the metallic reinforcing strip 13 has the key hole slots 20 registering with the elongated openings 18 and 19, the lower ends of these slots being of sufficient width to permit of passing the reinforcement over both of the wing nuts at the same time while their upper ends are of a width greater than the studs 9 but less than the inner ends of the wing nuts 10 so that after the curtain with its reinforcing strip has been passed over the wing nuts and lowered to engage the studs in the upper narrowed ends of the key hole slots, the reinforcement strip with the side curtain can be clamped upon the windshield standard by rotating the wing nuts so that their shoulders will engage the reinforcement strip.

It will be noted that the side curtain is clamped against the rear side of the windshield standard at spaced points which are offset from the rear side of the remaining portion of the standard so that snow, rain, etc. striking the portion of the curtain between the standard and sections may readily move laterally outward between the standard and side curtain.

From the above description it will be readily seen that the side curtain may be readily attached to or detached from the windshield standard without exposing the person carrying out the operation. Also the curtain being on the rear side of the windshield has its extreme edge protected by the windshield sections so that the tendency of separating from the sections owing to wind is avoided. The reinforcement strip secured to the edge of the curtain constitutes a stiffener for holding the edge in substantially the same plane, whereby the curtain is held in position to bridge the gap between the windshield sections and standard and to extend adjacent to the windshield sections and the weather-proofing means upon the curtain is held firmly against the sections. Furthermore, the number of devices for securing the curtain to the windshield is the minimum, and in fact, these devices may be the wing nuts and studs already upon the standard for another purpose. When these wing nuts are used for securing the curtain to the windshield, they extend rearwardly through the curtain so that they may be readily operated.

What I claim as my invention is:—

1. The combination with a windshield standard, of a side curtain having a pocket at one edge extending longitudinally of said standard and provided with a pair of spaced elongated apertures, of a reinforcing strip in said pocket having key hole slots registering with said apertures, and means upon the rear side of said standard adapted to pass through said apertures and slots for clamping said strip to said standard.

2. The combination with a windshield standard having a split portion, a section pivotally mounted in said split portion, and means for clamping said split portion upon the section pivot, of a curtain detachably secured to said standard by said clamping means.

3. The combination with a windshield standard having split portions, glass sections pivotally mounted in said standard split portions, rearwardly extending threaded members, and wing nuts upon said threaded members for clamping said split portions upon the pivots of said sections, of a side curtain, and a reinforcement secured to one edge thereof and detachably secured to said standard by said thumb screws.

4. The combination with a standard, a windshield section pivoted in said standard, and means upon the rear side of said standard for clamping said section in adjusted position, of a flexible side curtain having means to receive said clamping means whereby said curtain may be attached to said standard.

5. The combination with a standard, a windshield section pivoted in said standard, and means upon the rear side of said standard for clamping said section in adjusted position, of a flexible side curtain having openings to receive said clamping means whereby said curtain may be attached to said standard.

6. The combination with a standard and a windshield section pivoted in said standard, of a flexible side curtain adapted to overlap the rear side of said standard and a portion of said windshield section, and a common means for clamping both said windshield pivot and said side curtain to said standard.

In testimony whereof I affix my signature.

HALSTEAD H. SEELEY.